(12) United States Patent
Tong et al.

(10) Patent No.: US 6,178,766 B1
(45) Date of Patent: Jan. 30, 2001

(54) AIR-CONDITIONER WITH HIGH-EFFICIENCY DIFFERENTIAL COLD-VALLEY PIPES

(76) Inventors: Xiamin Tong; Amin Ji, both of Rm. 101, No. 17 Lane 50, Yun Jin Road, Shanghai 200032 (CN)

(*) Notice: Under 35 U.S.C. 154(b), the term of this patent shall be extended for 0 days.

(21) Appl. No.: 09/155,728

(22) PCT Filed: Mar. 31, 1997

(86) PCT No.: PCT/CN97/00027

§ 371 Date: Jun. 1, 1999

§ 102(e) Date: Jun. 1, 1999

(87) PCT Pub. No.: WO97/38267

PCT Pub. Date: Oct. 16, 1997

(30) Foreign Application Priority Data

Apr. 4, 1996 (CN) .................................................. 96116305

(51) Int. Cl.[7] ................................................................ F28D 5/00
(52) U.S. Cl. ................................ 62/305; 62/304; 62/311; 62/476
(58) Field of Search ............................. 62/305, 476, 304, 62/311

(56) References Cited

U.S. PATENT DOCUMENTS

| | | | |
|---|---|---|---|
| 4,274,266 | * | 6/1981 | Shires ...................................... 62/171 |
| 4,434,112 | * | 2/1984 | Pollock .................................. 261/153 |
| 4,757,695 | * | 7/1988 | Malnar ..................................... 62/305 |
| 4,869,075 | * | 9/1989 | Ikari et al. ............................... 62/280 |
| 4,884,416 | * | 12/1989 | Hwang .................................... 62/303 |
| 5,148,859 | * | 9/1992 | Beamer ................................... 165/41 |
| 5,168,722 | * | 12/1992 | Brock ...................................... 62/304 |
| 5,605,052 | * | 2/1997 | Middleton et al. .................... 62/171 |
| 5,606,868 | * | 3/1997 | Calvert ................................... 62/315 |
| 5,682,757 | * | 11/1997 | Peterson .............................. 62/259.2 |
| 5,775,114 | * | 7/1998 | Ji ............................................ 62/121 |
| 5,921,101 | * | 7/1999 | Wang ..................................... 62/305 |

\* cited by examiner

*Primary Examiner*—Henry Bennett
*Assistant Examiner*—Mark Shulman
(74) *Attorney, Agent, or Firm*—Ying-kit Lau J. D.

(57) ABSTRACT

An air-conditioner with high-efficiency differential cold-valley pipes, which include J pipes and a low-pressure circulating pump, has a first arc heat-exchanger which is formed by multiple-layer ladder-shaped corrugated plates and multiple-layer arc J pipe stacked alternatively, and a second arc heat-exchanger which is formed by multiple-layer arc J pipe and multiple-layer wave-shaped film-type evaporation face stacked alternatively. A low pressure pump is connected between the first arc heat-exchanger and the second arc heat-exchanger through pipelines. The air-conditioner solves the problems that the conventional air-conditioner consumes high energy, quality of the air in the room is low and the use of CFCs is confined.

7 Claims, 12 Drawing Sheets

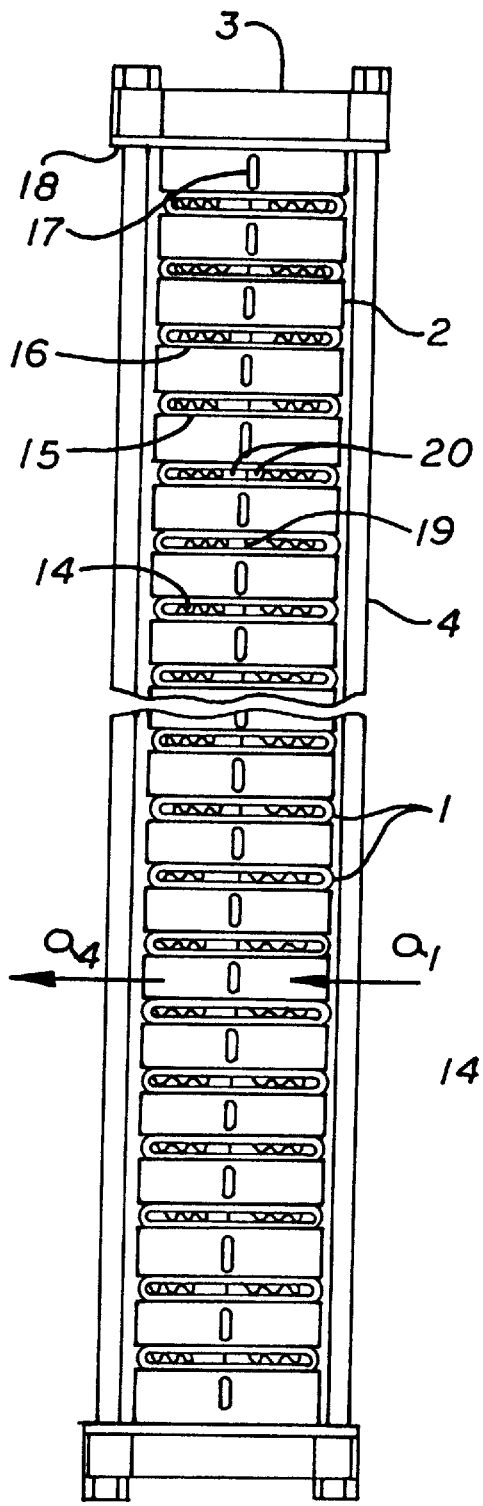
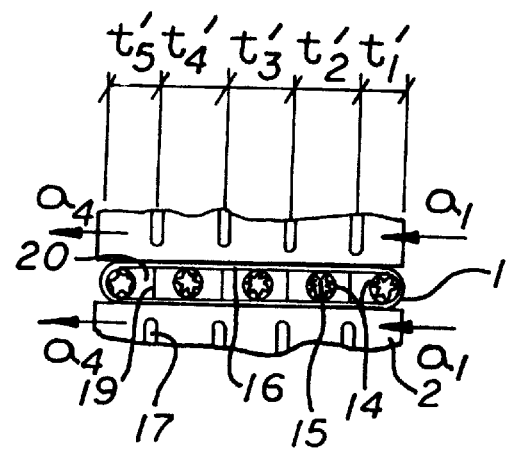
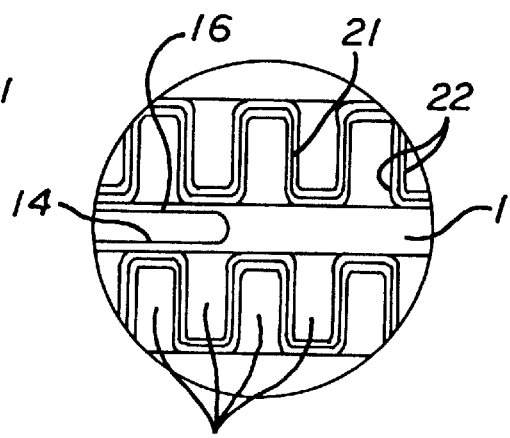
FIG. 4
FIG. 5
FIG. 6

AIR-CONDITIONER WITH HIGH-EFFICIENCY DIFFERENTIAL COLD-VALLEY PIPES

TECHNOLOGY FIELD

The present invention relates to a kind of air conditioning apparatus, particularly to a kind of low pressure difference heat pump air conditioner with air energy as refrigerating heating circulating power.

TECHNOLOGY BACKGROUND

The differential cold-valley pipe (herein after called J-pipe for short) is a kind of high efficiency heat exchange device featuring a large heat flow rate per unit area and enabling the end temperature difference for heat transmission to approach zero indefinitely. The Chinese patent application No. 941,121, 107.0 has put forward an "air energy 8-form circulation air conditioner" which is an all fresh air conditioner composed of an air energy heat pump J-pipe, a super condensation J-pipe, a low pressure difference energy transformation heat pump M, has rather high thermodynamic cycle efficiency and requires 100% outdoor fresh air for both cool (heat) output in its air conditioning just for achieving the optimal thermodynamic cycle efficiency. However, the above-mentioned technical scheme is mainly pointing to the theoretical research of 8-form circulation and in need of further improvement with respect to heat exchange and thermodynamic cycle efficiency of J-pipe. There still exist quite a few problems in its cooling-weight ratio, volumetric ratio, industrialization of manufacturing process and reducing product cost, hence it is difficult to achieve a fundamental result in solving the three major difficult problems (high energy consumption, low air quality, limited use of CFCs (chloroflucrocarbons).

SUMMARY OF THE PRESENT INVENTION

In order to solve the above-mentioned problems, the present invention puts forward a kind of high efficiency J-pipe air conditioner, in said air conditioner is provided an arc J1' heat exchange device which is formed by stacking alternately multiple-layer arc J1 strips and multiple-layer corrugated step corrugations and being tightly clamped up into frames composed of arc rib-shaped clamping plates and tie rods, at the contact places of clamping plates and step corrugations there are buffer cushions, ducts F' formed by step corrugations have a flow direction of S shape, and on their wall surface are cut out several long and strip-shaped heat insulating ports, each J1 strip has inner corrugated plates inserted into its flat tubes, outside the flat tubes is wrapped thin aluminum sheet, at the outlet and inlet of the working substance are connected respectively the incoming liquid branch tube and suction vapor branch tube; in the high efficiency J pipe air conditioner is also provided an arc J2' heat exchange device which is formed by stacking alternately multiple-layer arc J2 strips and multiple-layer corrugated membrane corrugations and being tightly clamped up in frames composed of arc rib-shaped clamping plates and tie rods, at the contact places of said clamping plates and membrane corrugations there are buffer cushions, ducts F formed by membrane corrugations have a flow direction of S shape and on their wall surface are cut out several long and strip-shaped heat insulating ports, supporting frames of membrane corrugations are constituted from step corrugations made of thin aluminum or other metallic sheet or fine metallic wire mesh by adhering step membranes on their both surfaces thus to form the membrane corrugations, each J2 strip constitutes by inserting inner corrugated plates into its flat tubes has a complete t1'~t2' non-isothermal working substance flow passage, at the outlet and inlet of the working substance are connected respectively incoming vapor branch tube and outgoing liquid branch tube, outside the flat tubes is wrapped aluminum sheet or corrosion resistant metallic sheet, the flat tubes can be made directly form corrosion resistant metal with membrane type evaporating surface adhered further on the outside, between the parallel arranged flat tubes and membrane type evaporating surfaces are inserted water-carrying yarns; a low pressure pump M is provided between the J1' heat exchanger device and J2' heat exchanger device, the low pressure pump M will work at a rather low condensing pressure P2 of J2' and a rather high evaporating pressure P1 of J1' and can jointly convey liquid and vapor; the maximum refrigerating capacity can be obtained when the circulating working substance is a single or mixed (azeotropy or non-azeotropy) refrigerant, the 刀-form circulation and all fresh air 8-form circulation of the highest circulation efficiency can be obtained when the circulating working substance is a working substance pair composed of absorbent and refrigerant.

The present invention aims at creating a kind of series J pipe air conditioners with rather high practical value and rather high thermodynamic cycle efficiency, and striving to solve the three major difficult problems confronting the current air conditioning industry as high energy consumption, low air quality, limited use of Chloroflucrocarbons (CFCs).

The present invention, first of all, is striving for the raise of heat exchange efficiency and thermodynamic cycle efficiency and full utilization of air energy. The high efficiency J pipe means that heat exchanger of rather small volume can achieve large heat exchange capacity and rather low heat transmission temperature difference. Due to high efficiency characteristics of J pipe, the key technical indices of the present invention on cooling-weight ratio, volumetric ratio (volume occupied by unit refrigerating capacity air conditioning), manufacturing cost, etc. are superior to current air conditioners by merging the full utilization of air energy and non-isothermal, low temperature difference heat transfer characteristics of high efficiency J pipe organically into one integral can run at a COP (refrigerating capacity/net output power of low pressure pump) value above 25 during 刀-form circulation, and rn at a COP value above 30 during all fresh air 8-from circulation.

BRIEF EXPLANATION OF ACCOMPANYING DRAWINGS

FIG. 4 is an enlarged left sectional view of FIG. 2.

FIG. 5 is a sectional view of the slender round tube J2 strips in FIG. 2.

FIG. 6 is a partial enlarged view of designation 5 in FIG. 2.

THE PREFERRED EMBODIMENT MODE OF THE PRESENT INVENTION

Figure 1:
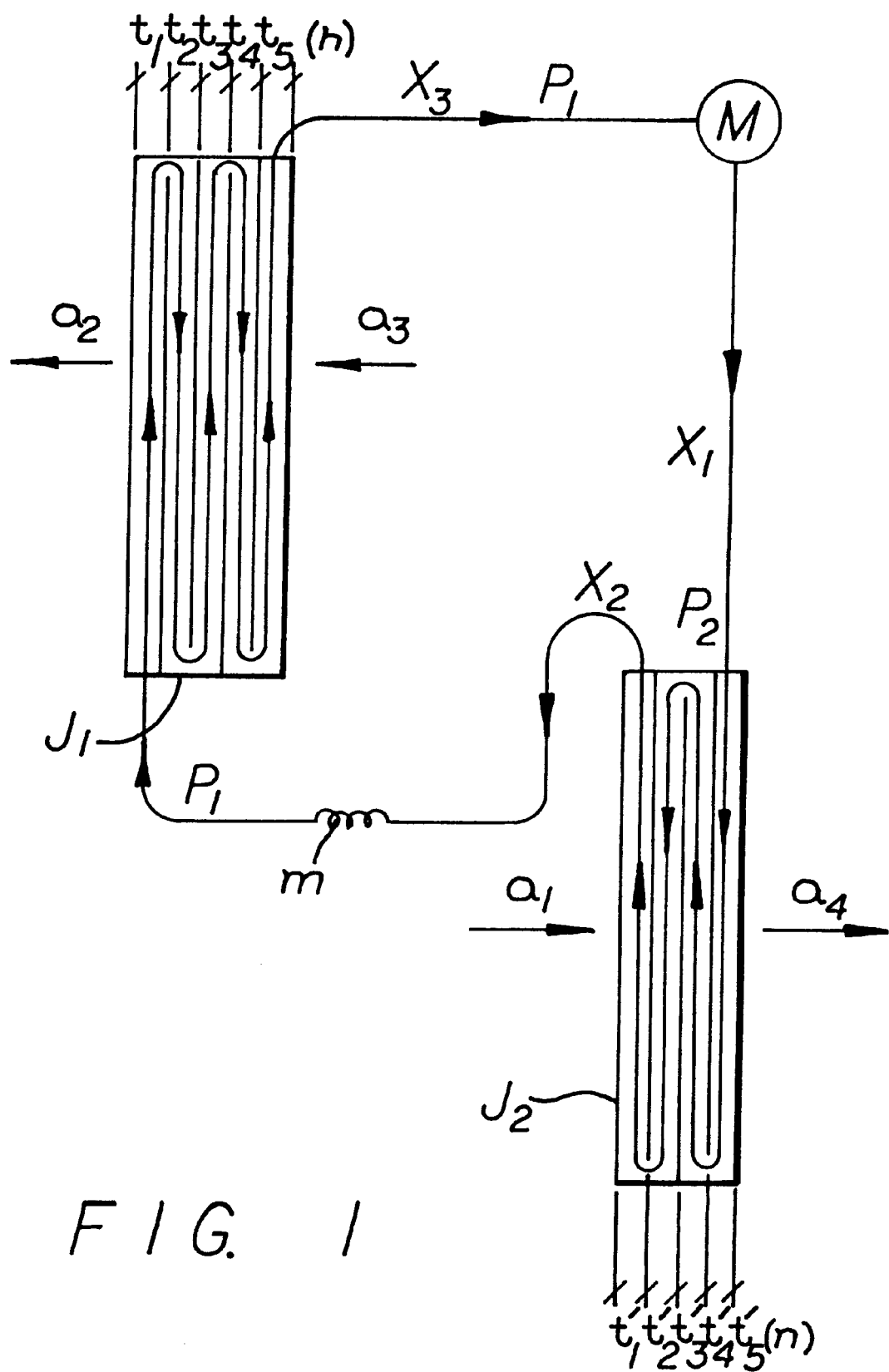
FIG. 1 is a schematic diagram of the cycle principle of the high efficiency J pipe air conditioner of the present invention.

FIG. 1 is a schematic diagram of circulation principle of the present invention.

J1 is J1 pipe, J2 is J2 pipe, M is low pressure pump, m is capillary tube. The low pressure pump is connected between the incoming vapor tube of J2 pipe and suction vapor tube of J1 pipe, the heat pump type is connected in between a four-way conversion valve; the capillary tube m is connected between the liquid supplying tube of J2 pipe and an incoming liquid tube of J1 pipe.

Due to a rather high heat exchange efficiency of J pipe, the J1 pipe and J2 pipe by adopting (2–5) temperature zones of separation will realize 0.1~0.5° C. heat transfer temperature difference.

The working pressure of J1 pipe is P1, the working pressure of J2 pipe is P2.

Outdoor air a3 through J1 pipe being cooled from tn–t1 to a2 state is conveyed indoor, a2≈t1, a3≈tn.

Indoor air a1 through J2 pipe from t1'~tn' absorbing heat, after absorbing moisture at a4 state is discharged outdoor, t1' approaches wet bulb temperature of a1.

The liquid state dilute solution x2 composed of absorbent and corresponding refrigerant through J2 pipe after being cooled to t1' temperature through capillary tube m being decompressed to P1, in J1 pipe is heated by air gradually from t1~tn to a temperature approaching a3 dry bulb temperature of a mixture x3 of superheated refrigerant vapor and absorbent concentrated solution, x3 through the low pressure pump M is pressurized to x1 state of P2 to enter J2 and from tn'~t1' is gradually cooled to dilute solution of x2. The concentrated absorbent solution being cooled to tn'~t1' with its surface differential pressure being rather low has a strong ability to absorb vapor state refrigerant, hence the equilibrium condensing pressure P2 of J2 pipe is rather low.

The window machine and outdoor machine of split-body machine of high efficiency J pipe air conditioners are provided with a bottom tray, in the bottom tray is stored water solution or other cool-carrying agent solution at a certain level. The condensed water of J1 through dripping tube flows to the bottom tray and is sprayed to moisten ventilation ducts F of J2 by water circulating system through timing and metering, F ducts have water carrying and water absorbing capacity and can form a large superficial evaporating water film when it is in wetting state and its inner hydrous layer has very good thermal conductivity. So J2 radiates heat in continuously completed wet state. Hence t1' can indefinitely approach wet bulb temperature of a1, and as the t1'~tn' temperature rise being is rather small, the above-mentioned circulation is an 8-form circulation.

When the cooled air passing through J1 pipe is indoor air a1 and the cooling air passing through J2 is outdoor air a3, x3 can only be heated to dry bulb temperature of a1 (a1<a3), the lowest temperature t1' of J2-pipe can also only be cooled to wet bulb temperature of a3, and the wet bulb temperature of a3 is higher than wet bulb temperature of a1. Due to changes of air state via J1 pipe and J2 pipe, the 8-form circulation will evolve to 刀-form circulation.

As compared with current air conditioners, the J1 pipe in 8-form and 刀-form circulation corresponds to evaporator, and generator, J2 pipe corresponds to condenser and absorber. The distinction lies in that the evaporating pressure P1 of J1 is higher than the current air conditioners, while the condensing temperature and pressure P2 are far lower than the current air conditioners; hence the low pressure pump M as compared with compressors of equal flow volume requires a net power less than ⅓, while with a refrigerating capacity being able to increase over 1 time.

Figure 2:
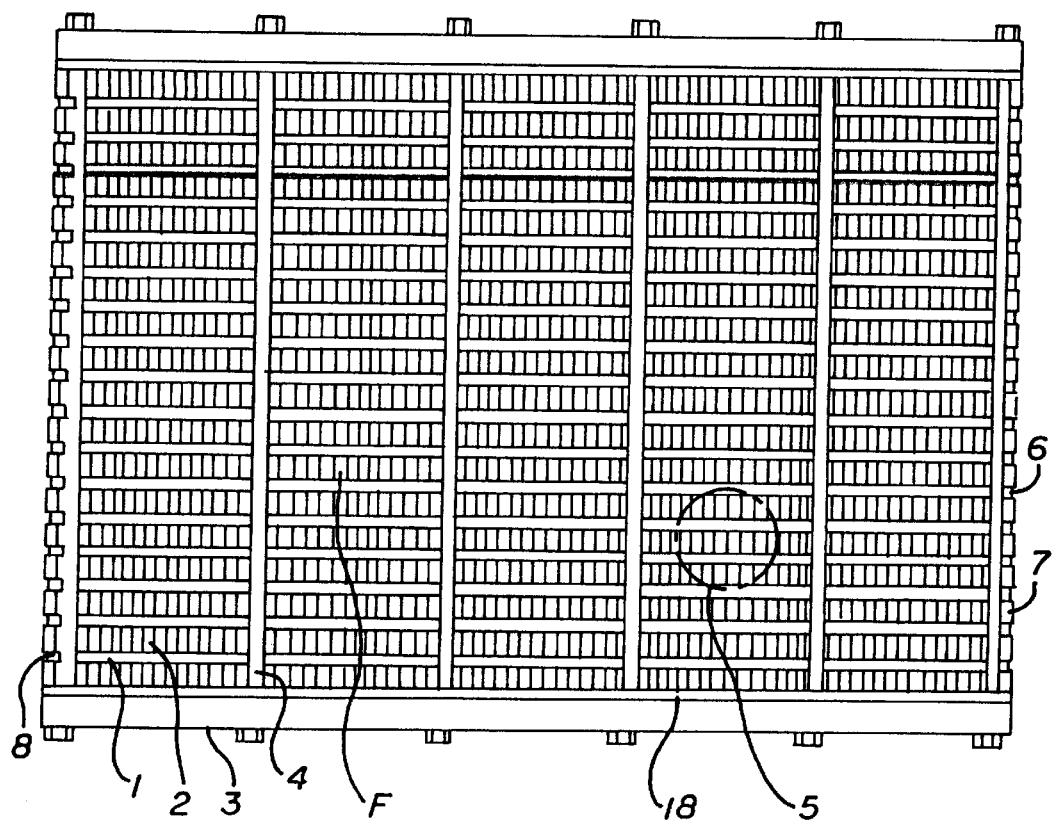
FIG. 2 is a front view of the J2 pipe.
Figure 3:
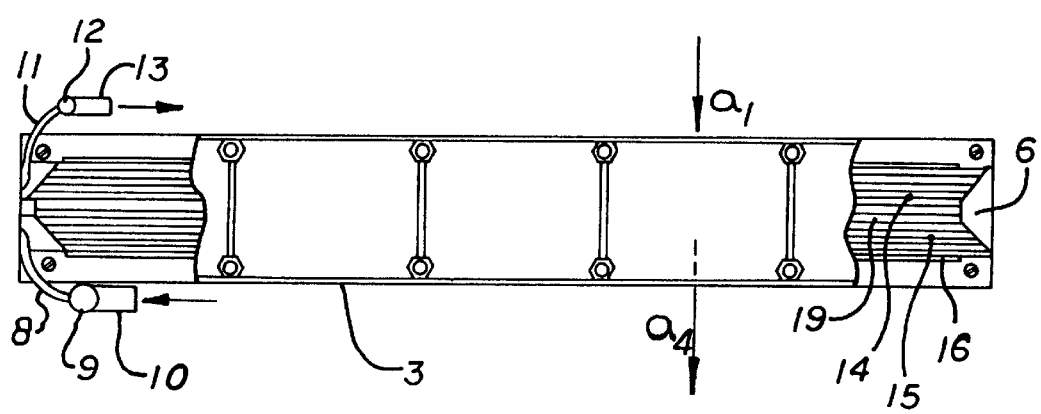
FIG. 3 is a top view of FIG. 2

Referring to accompanying FIGS. 2,3,4,5,6, FIG. 2 is a front view of J2 pipe, FIG. 3 is a top view of J2 pipe, FIG. 4 is an enlarged left sectional view of J2 pipe, FIG. 5 is sectional view of slender round tubes of J2 strips, FIG. 6 is a partial enlarged view of designation 5 in FIG. 2.

J2 strips 1, membrane-type, step-shaped corrugated plates (membrane corrugations) 2, clamping plates 3, tie rods 4, curved conduits 6, pads 7, incoming vapor branch tubes 8, parallels connecting tubes 9, incoming vapor tubes 9, incoming vapor tubes 10, outgoing liquid branch tubes 11, parallel connecting tubes 12, liquid supplying tubes 13, flat tubes 14, inner corrugated plates 15, membrane type evaporating surfaces 16, heat insulating ports 17, buffer cushions 18, heat insulating strips 19, water-carrying yarns 20, step-shaped corrugated plates (step corrugations) 21, and step-shaped membrane type evaporating surfaces (step membranes) 22.

The heat exchange system of J2 pipe is formed by stacking alternately multiple-layer J2 strips 1 and multiple-layer membrane corrugations 2 and being tightly clamed up into frames composed of rib-shaped clamping plates 3 and tie rods 4. Ducts F of cooling air a1~a4 is constituted from membrane corrugation 2 and J2 strips 1, both ends of each membrane corrugation 2 have each a slender rectangled strip-shaped pad 7, at the contact places of clamping plates 3 and membrane corrugations 2 there are adhered buffer cushions 18; each J2 strip 1 constitutes in its flat tube (14) a complete from tn'~t1' non-isothermal working substance passage, at the inlet of working substance there is the incoming vapor branch tube 8 connected in parallel to the parallel connecting tube 9 (or distributor) of the incoming vapor tube 10, at the outlet of working substance there is the outgoing liquid branch tube 11 connected in parallel to the parallel connecting tube 12 (or distributor) of the liquid supplying tube.

See FIGS. 3,4. Two flat tubes 14 arranged in parallel spacing in J2 strips 1 are inserted with inner corrugated plates 15 made of thin aluminum sheet for enlarging heat dissipating area of working substance fluid, at the turns of flow of working substance are provided curved conduits 16, at the outlet and inlet of working substance are connected respectively the outgoing liquid branch tube 11 and incoming vapor branch tube 8, outside flat tubes is wrapped membrane type evaporating surfaces 16, between flat tubes 14 and membrane evaporating surfaces 16 are inserted 2 water-carrying yarns 20, the water-carrying yarn 20 is divided into 2 temperature zone by a heat insulating strip 19 made of heat insulating material, hence each flat tube 14 constitutes an isothermal heat exchange zone, the flat tube can be made of thin metallic tube about Φ6 mm pressed into narrow and thin flat tube.

FIG. 5 is sectional view of slender round tubes of J2 strips. The working substance flow passages are slender round tubes 14' into which are inserted inner corrugated plates 15, each slender round tube 14' constitutes an isothermal heat exchange zone with heat insulating strip 19 as boundary, the advantages of J2 strips composed of slender round tubes 14' lies in more divided temperature zones available and reduce the pressure of membrane corrugations 2 and clamping plates 3. Flat tubes 14 and slender round tubes 14' can be made of choice corrosion resistant metal of high heat conductivity, in case of using copper or aluminum material, surface corrosion-resisting treatment ought to be conducted to raise durability.

See FIGS. 5,6, the membrane corrugations (2) with corrugated fins are made of thin metallic sheet or ribbon of metallic wire mesh with non-woven fabric adhered to both surfaces, after being formed the tow surfaces of the middle step corrugation 21 are adhered with step membranes 22 to compose the membrane corrugation 2, on the vertical wall face of membrane corrugations 2 at the upper side of heat insulating strip 19 are cut out long and strip-shaped heat insulating ports 17 for dividing into heat exchange temperature zones and cooling air can herein form turbulence to strengthen heat exchange. The step corrugations 21 as supporting frames can be made of extra thin corrosion resistant metallic (stainless steel or stainless iron) sheet or fine metallic wire mesh. The membrane type evaporating surfaces 16, step membrane 22, water-carrying yarns 20 are made of corrosion resistant non-woven fabric (adhesive-bonded fabric) of very strong water-carrying and water absorbing ability, during moistened state, the membrane type evaporating surfaces 16, step membranes 22, water-carrying yarns 20 are saturated with water, the step-shaped ducts F constituted from step membranes 22 and membrane evaporating surfaces 16 have large water evaporating surface area, the water containing layers also have excellent heat conducting property; the water content stored in water-carrying yarns 20 can make F surfaces under a continuously moistened state to extend the interval of water spraying time as long as possible, and on the other hand to strengthen the heat conductivity between J2 strips 1 and membrane corrugations 2. Since ducts F are working under a continuously all-wetted state, hence x2 can be cooled to wet bulb temperature of a1. The step-shaped ducts F can be designed in their lateral or longitudinal flow directions to an S shape to further enhance heat exchange performance.

The mixture x1 of superheated refrigerant vapor and absorbent concentrated solution compressed to P2 by the low pressure pump M enters from incoming vapor tubes 10 through parallel connecting tubes (or distributors) 9 into various incoming vapor branch tubes 8, the dilute solution x2 which is cooled gradually and non-isothermally from tn'~t1' to wet bulb temperature of a1 in the flat tubes 14 (or slender round tubes 14') of J2 strips 1 converges from the outgoing liquid branch tubes into the parallel connecting tubes (or distributors) 12 and flows through the liquid supplying tubes 13 to the J1 pipe.

Figure 7:
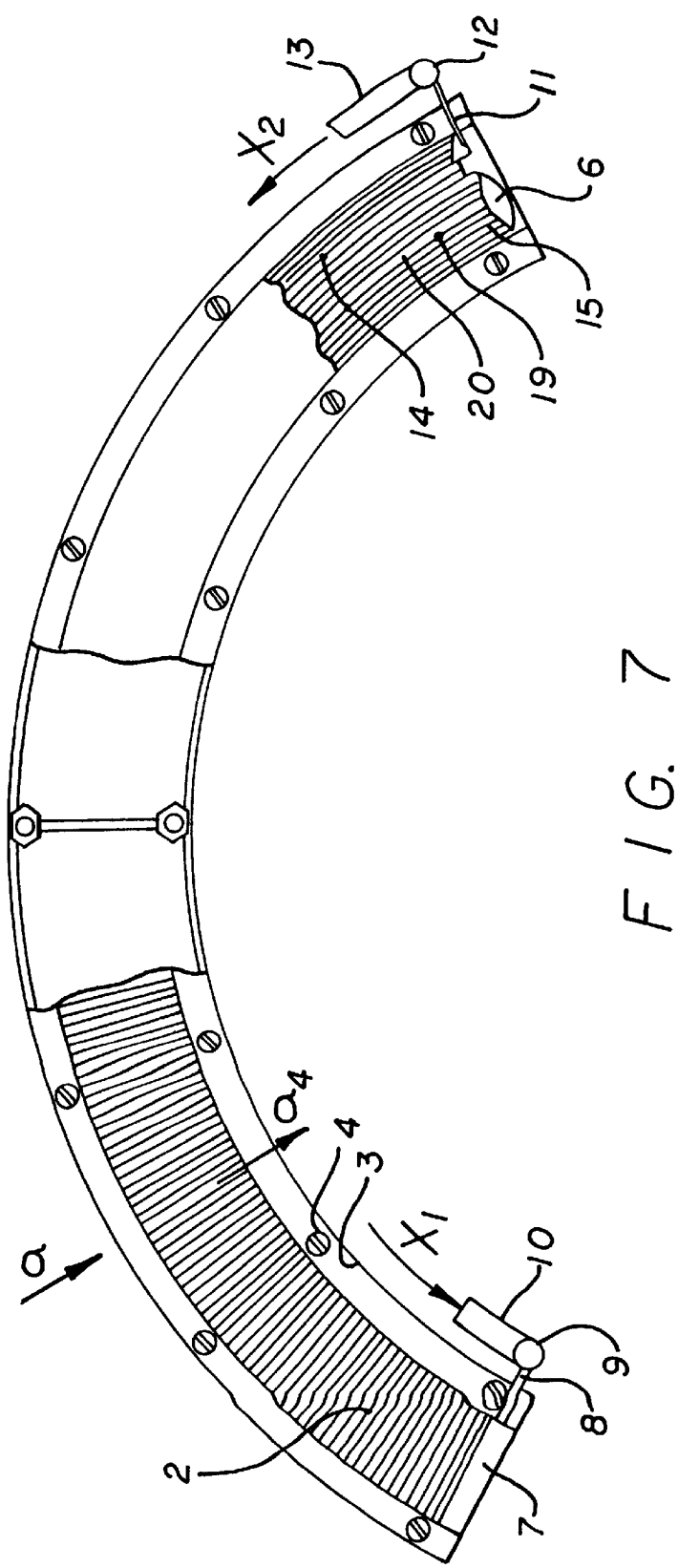
FIG. 7 is a sectional view of steps of the arc J2' pipe.

FIG. 7 is a sectional view of steps of the arc J2' pipe. In the figure there are 3 flat tubes 14 in the J2 strips 1 arranged along concentric arc direction in parallel spacing, ducts F of membrane corrugations 2 show a sector-shaped arrangement, the rest structures are identical with J2 pipe. The J2' pipe can further enlarge heat dissipating area, lower ventilation resistance, cooling-weight ratio and volumetric ratio.

J2 and J2' are a kind of all-wetted heat exchanger of very high heat exchange efficiency to have a wide application scope, and are generally used as condenser in J pipe air conditioners, however, can also be used as evaporator.

Figure 8:
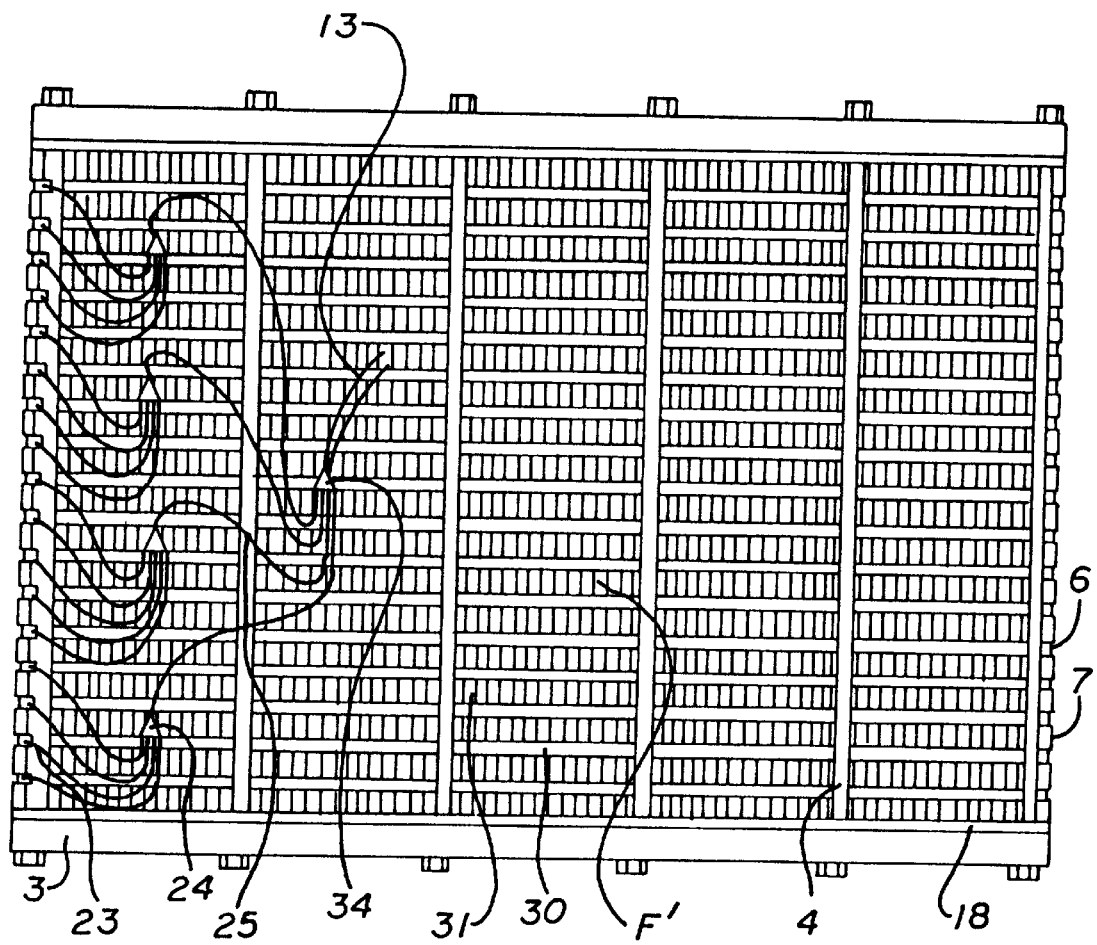
FIG. 8 is a front view of J1 pipe.
Figure 9:
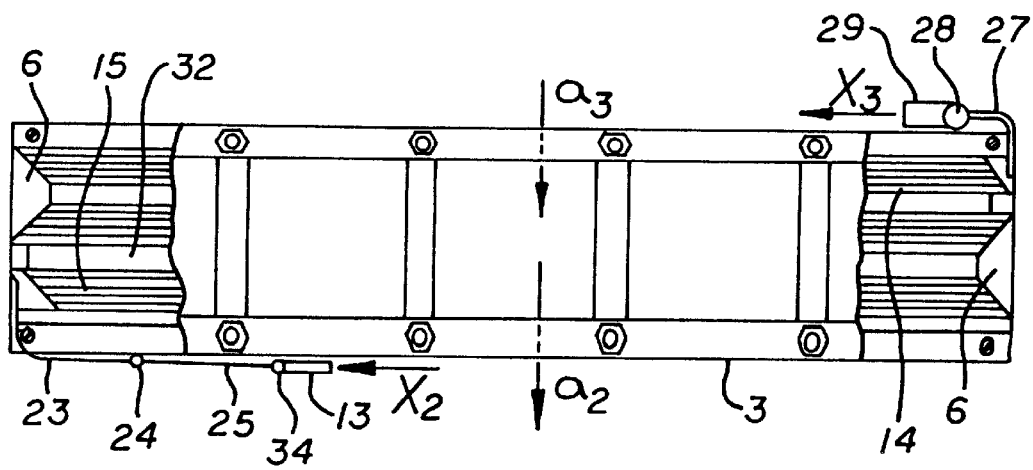
FIG. 9 is a top view of FIG. 8.
Figure 10:
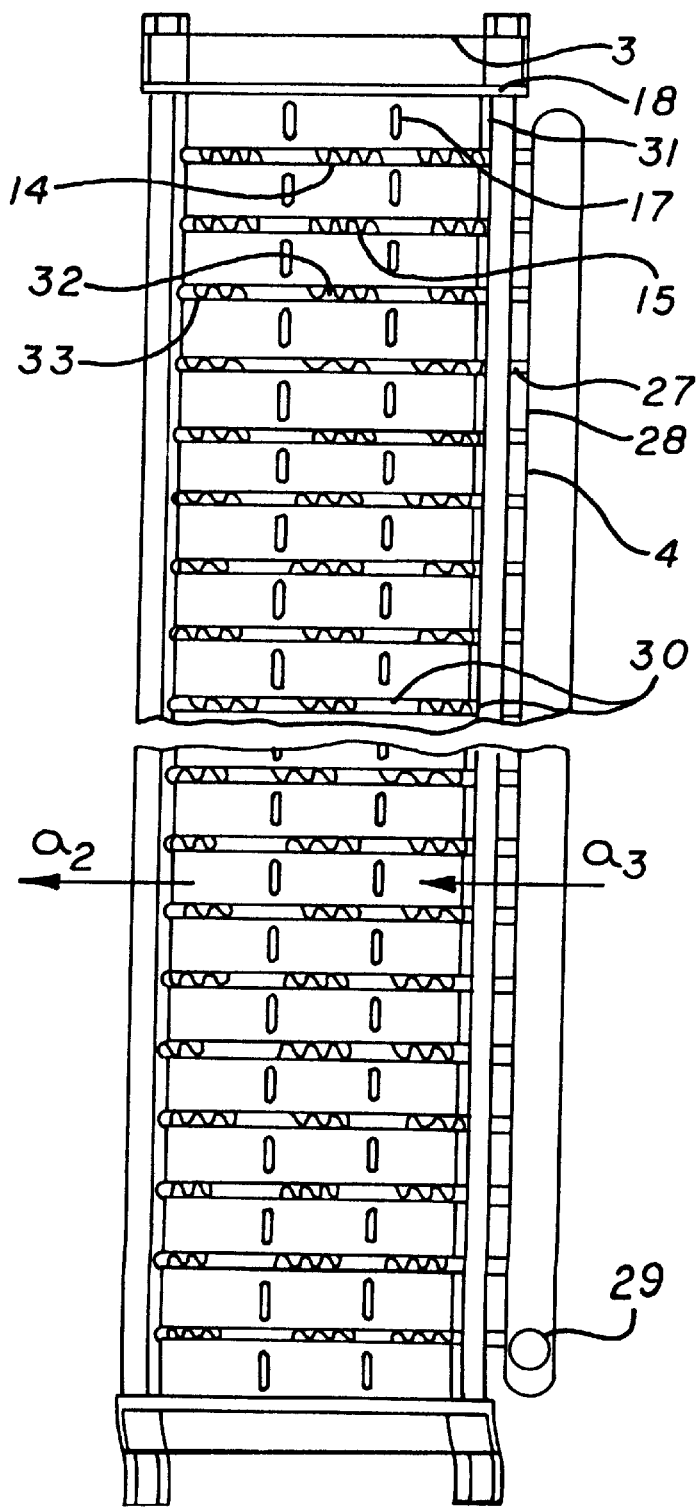
FIG. 10 is an enlarged left sectional view of FIG. 8.

Referring to FIGS. 8,9,10, FIG. 8 is a front view of J1 pipe, FIG. 9 is a top view of J1 pipe, FIG. 10 is an enlarged left sectional view of J1 pipe.

Clamping plates 3, tie rods 4, curved conduits 6, pads 7, flat tubes 14, inner corrugated plates 15, J1 strips 30, step-shaped corrugated plates (step corrugations) 31, ducts F', incoming liquid branch tubes 23, distributors 24, capillary tubes 25, split-flow heads 34, liquid supplying tubes 13, vapor suction branch tubes 27, parallel connecting tubes 28, vapor suction tube 29, heat insulating chambers 32, water-leaking yarns 33, heat insulating ports 17.

The heat exchange system of J1 pipe is formed by stacking alternately multiple-layer J1 strips 30 and multiple-layer step corrugations 31 and being tightly clamped up into frames composed of rib-shaped clamping plates 3 and tie rods 4. Ducts F' of cooled air a3→a1 are constituted form step corrugations 31 and J1 strips 30, both ends of each step corrugation 31 have a slender rectangled strip-shaped pad 7, at the contact places of clamping plates 3 and step corrugations 31 there are adhered buffer cushions 18; each J1 strips 30 in flat tubes 14 constitutes a complete from t1~tn non-isothermal working substance flow passage, at the outlet of working substance is connected an incoming liquid branch tube 23, the incoming liquid branch tube 23 is connected in parallel to a distributor 24 of the capillary tube 25, at the outlet of working substance is connected a vapor suction branch tube 27, the vapor suction branch tube 27 is connected in parallel to the parallel connecting tube (for distributor) 28 of vapor suction tube 29.

The step corrugations 31 with corrugated fins are made of thin aluminum sheet, the spacing and height of their step-shaped ducts F' are designed according to heat dissipating characteristics of air and heat transfer temperature difference requirement for refrigeration, their step-shaped slope is rather small to approximate a rectangle, ducts F' can be designed in their lateral or longitudinal flow direction to an S shape to further enhance heat exchange performance, at the upper side of heat insulating chambers 32 on the vertical wall surfaces of the step corrugations 31 are cut out long and strip-shaped heat insulating ports 17 used to divide heat conducting temperature zones and to enhance heat exchange.

In FIGS. 9, 10, each J1 strip 30 has 3 flat tubes 14 arranged in parallel spacing and in the flat tubes 14 are inserted inner corrugated plates 15 for enlarging working substance heat absorbing area, at the turns of flow of working substance, there are curved conduits 6, outside the flat tubes 14 is wrapped thin aluminum sheet to make F' as continuous uniform flow passages, hence J1 strips 30 and step corrugations 31 are the same aluminum sheet at their joining places as the same metal being less easy to cause electrochemical corrosion. The enclosed air chambers formed between the thin aluminum sheets and flat tubes 14 are heat insulating chambers 32 being used to divide heat conducting temperature zones so as to make each flat tube 14 constitute an isothermal heat exchange zone. The flat tubes 14 adopt less width and rather thin tube wall, less width can decrease the loading of step corrugations 31 and clamping plates 3, rather thin tube wall can enhance expansion action to make J1 strips 30 and step corrugations 31 nestled tightly against each other to enhance heat exchange.

The liquid state dilute solution x2 composed of absorbent and refrigerant enters from the liquid supplying tube 13 into the split-flow head 34 to flow in split streams to various capillary tubes 25, from capillary tubes to enter into distributors 24 of various sets and to pass through various incoming liquid branch tubes 23 to enter the working substance flow passage of J1. x2 in flat tubes 14 is heated by outdoor air a3 gradually to superheated refrigerant vapor of dry bulb temperature of a3 and the liquid vapor mixture x3 of superheated concentrated absorbent solution, and converges from the vapor suction branch tube 27 into parallel connecting tube 28 (or distributor) through vapor suction tube 29 to be pumped away by the low pressure pump M, simultaneously outdoor air a3 is lowered in temperature and in moisture in ducts F' to a1 state to be inputted indoor, the temperature of a1 approaches the evaporating temperature of refrigerant in J1 strips 30. The strip-shaped water-leaking yarns 33 at the left side of J1 strips 30 make F' ducts of J1 pipe on air exit surface form a mutually linked up water flowing surface, so as being able to quickly eliminate the condense water on surface of the step corrugations 31. The thin aluminum sheet selected for making step corrugations 31 and wrapping J1 strips 30 ought to be hydrophilic aluminum sheet.

Same as J2 pipes, the J1 pipe can similarly be made into arc J1' pipe, the J1 pipe is generally used as evaporator in J pipe air conditioners, however, it can also be used as condenser to make into J1J1 type J pipe air conditioners. J1 pipe is a kind of heat exchanger of rather high heat exchange efficiency apparently with extensive application value.

Figure 11:
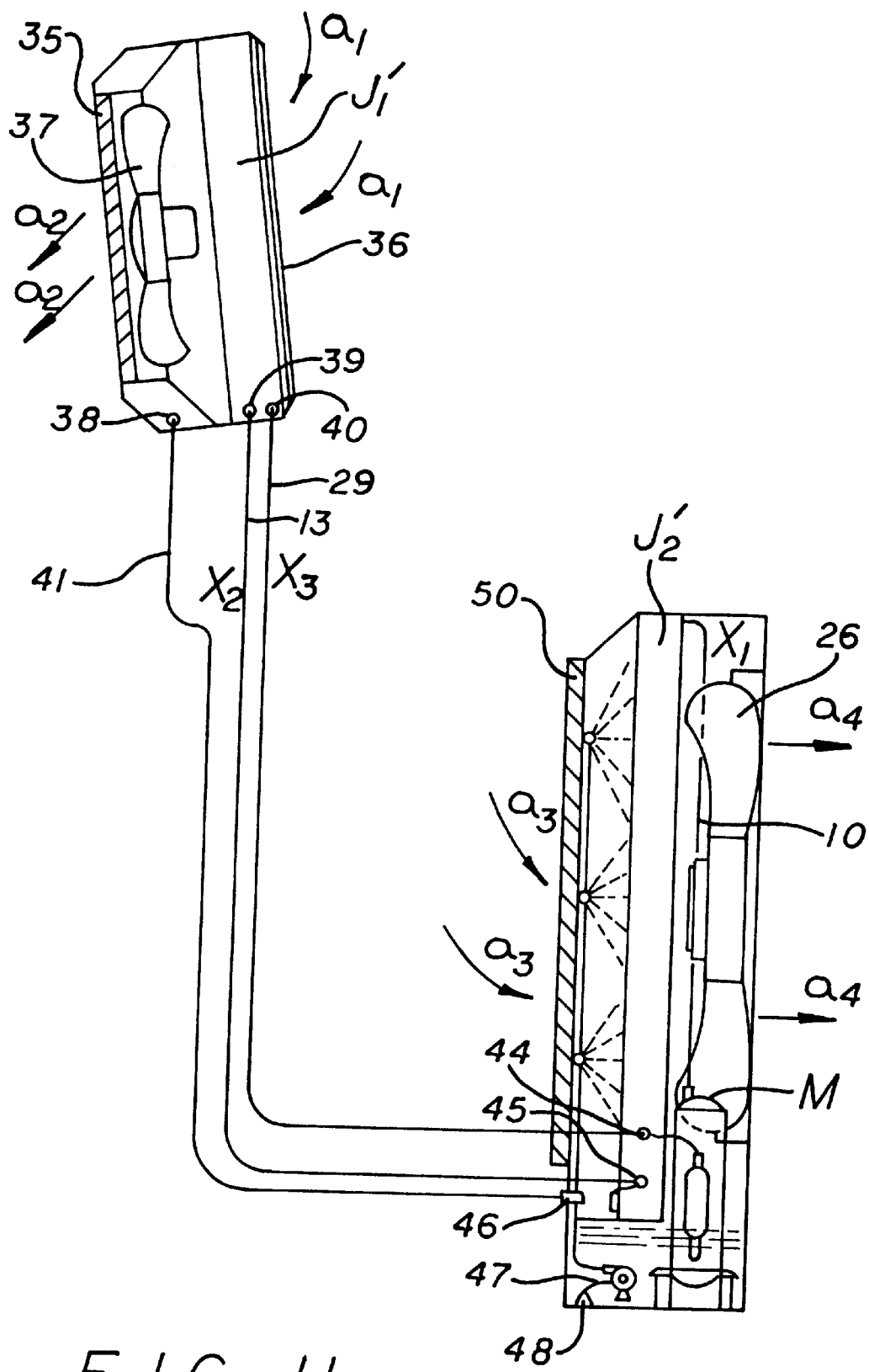
FIG. 11 is a structural schematic diagram of J1 J2 刀-form extension machine.

FIG. 11 is a structural schematic diagram of J1J2 刀-form split-body machine. J1 means J1 pipe is used as evaporator, J2 means J2 pipe is used as condenser, split-body machine means split-body type air conditioner, 刀-form means 刀-form circulation.

The indoor machine is composed of a J1 (or J1') pipe, a fan 37, etc. Indoor air a1 under suction action of the fan 37 mounted in front of J1 pipe is from the rear of J1 pipe through a filter screen 36, after being cooled to a2 in J1 pipe through guide of an adjustable damper 35 and then is conveyed indoor, the temperature of a2 can be defined by the pressure state of P1. The condense water is led to the bottom tray of the outdoor machine through a dripping tube 41 connected to an adapter 38, the liquid supplying tube 13 for working substance is connected to an adapter 39, the vapor suction tube 29 for working substance is connected to an adapter 40. Due to a rather low ventilating resistance of J1 pipe (or J1' pipe), hence an axial flow fan may be used.

The outdoor machine is composed of a J2 (or J2') pipe, fan 26, low pressure pump M, bottom tray, water level controller, water circulating system, etc. Outdoor air a3 under suction of the fan 26 at the right side of J2 pipe from left side through a water baffle 50 to absorb heat and moisture in the ducts F of J2 to a4 state is discharged to outdoor atmosphere. The water level in bottom tray is controlled by a water supply tube of the water level controller. The water circulating system is composed of a water pump 47, filter 48, nozzles 49 and connecting tubing to a automatically control the system at intervals and in timing, metering to moisten the air facing surface of J2. The low pressure pump M is mounted in the bottom tray, water baffle 50 is mounted at air inlet to prevent water mist from splashing out.

The working substance connecting tubing of the J1J2 刀-form split-body machine is the same as split-body air conditioners for sale on market, the liquid supplying tube 13 is connected to a connector valve 45 of the outdoor machine, the vapor suction tube 29 is connected to a connector valve 44 of the outdoor machine. The dripping tube 41 is connected to an adapter 46 of the outdoor machine to lead condensed water to bottom tray.

The J1J2 刀-form split-body machine has rather high thermodynamic cycle efficiency, its outdoor unit made of J2 pipe can also be equipped with the indoor unit of the current air conditioner, however, with a somewhat lowered efficiency.

Figure 12:
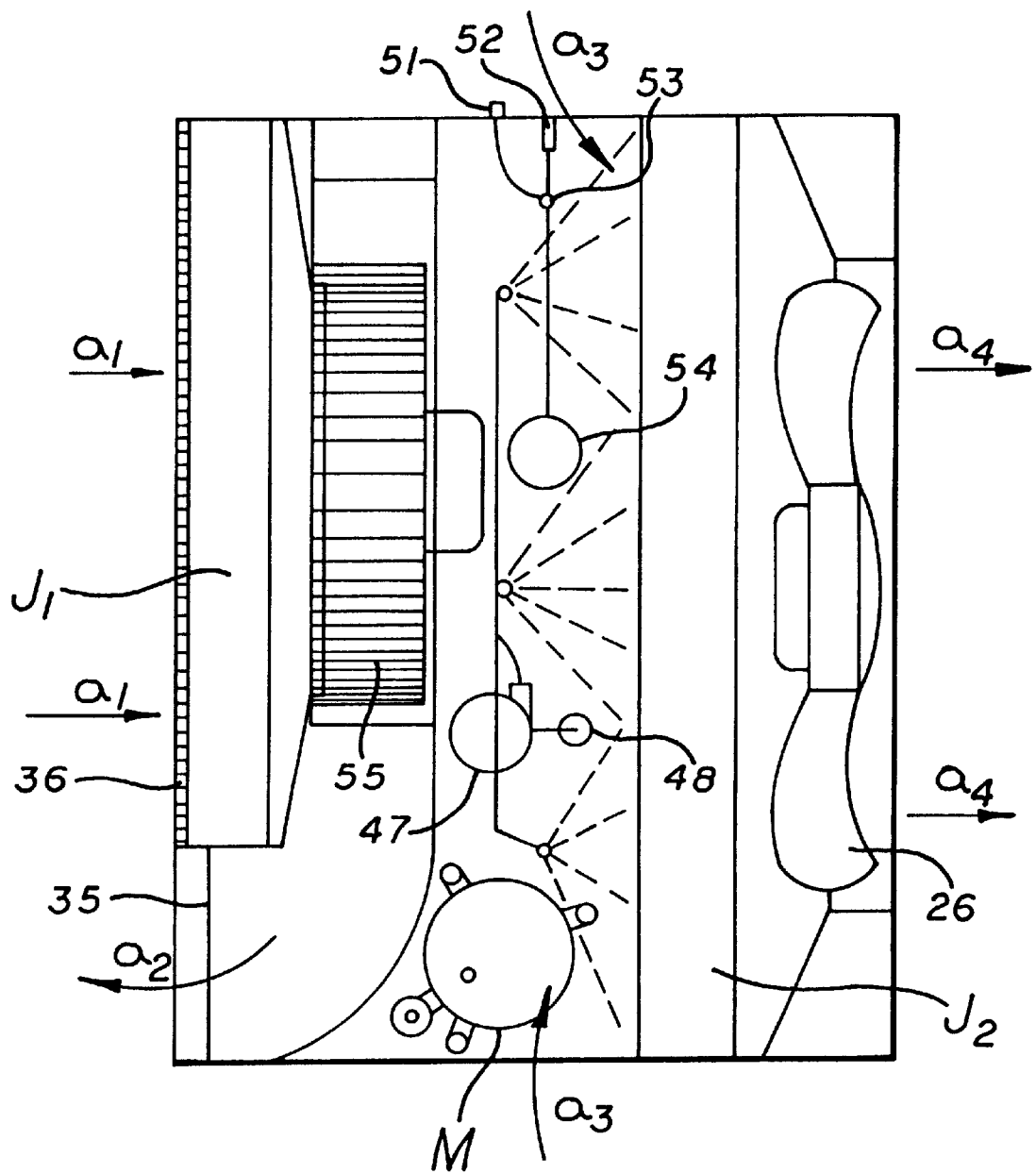
FIG. 12 is a structural schematic diagram of J1 J2 刀-form window machine.

FIG. 12 is a structural schematic diagram of a J1J2 刀-form window machine. J1 means the evaporator uses J1 pipe, J2 means the condenser uses J2 pipe, 刀-form window machine means a window type air conditioner of 刀-form circulation. Its ventilation structure is the same as window machines for sale on market, a centrifugal fan 55 will suck air at the rear side of J1, indoor air a1 is from one side of the face plate through a filter screen 36 to be cooled in ducts F' of J1 to a2, then through a volute passage to pass the guide of a guiding air damper 35 at the other side of face plate and is conveyed indoor. Outdoor air a3 from both sides outside the wall through a water baffle to absorb heat and moisture in ducts F of J2 to a4 state is sucked by fan 26 to outdoor atmosphere. The water level in bottom tray is controlled by a water level controller composed of a float 54, an on-off port 53, a support 52, and a water supply slender tube 51. The water circulating system is composed of a water pump 47, a filter 48, etc. to spray and moisten the air facing surface of J2 at intervals in timing and metering (generally to spray about 15 seconds every 20 minutes). The low pressure pump is mounted in the bottom tray, the water baffle is mounted at both sides of air inlet outside the wall.

Figure 13:
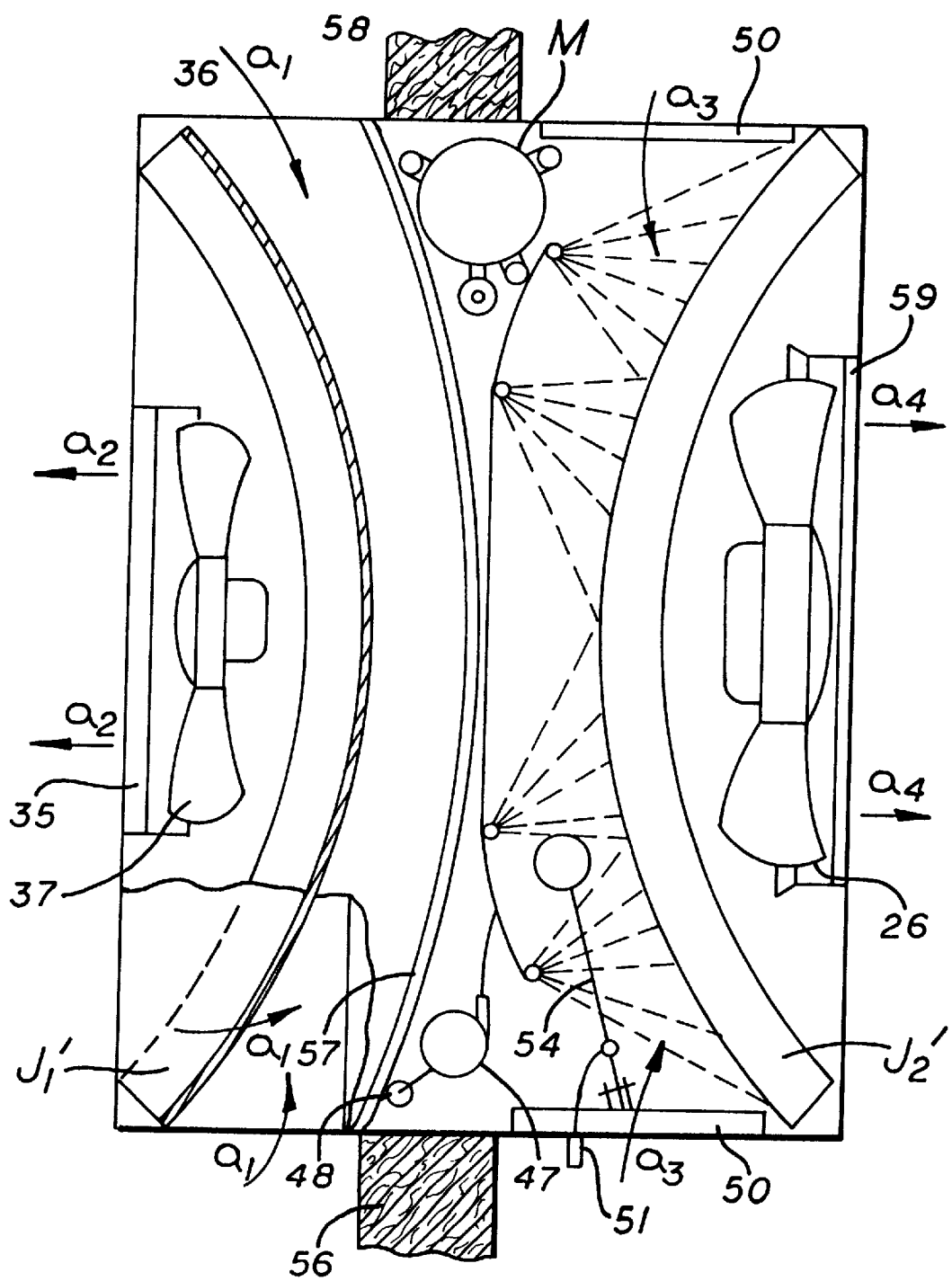
FIG. 13 is a structural schematic diagram of J1' J2' 刀-form window machine.

FIG. 13 is a structural schematic diagram of a J1'J2' 刀-form window machine. A fan 37 in front of indoor side is mounted in the concave arc of J1', under its suction indoor air a1 from air inlets 58 on both indoor sides through a filter screen 36 from the concave arc face of J1' pipe enters ducts F' to be cooled to a2 then through guide of an adjustable air damper 35 and is conveyed indoor. A fan 26 at the rear end on the outdoor side is mounted in the concave arc of J2', under its suction outdoor air a3 from a water baffle 50 on both sides of outside wall 56 through the convex arc face of J2' pipe enters ducts F to absorb heat and moisture to a4 state and is discharged to outdoor atmosphere.

A protecting screen 59 at the outdoor rear end face is use to protect the fan 26, an arc partition 57 in the middle is use to insulate heat and separate ducts, the mounting of water circulating and level control systems and low pressure pump M in bottom tray is not repeated.

Figure 14:
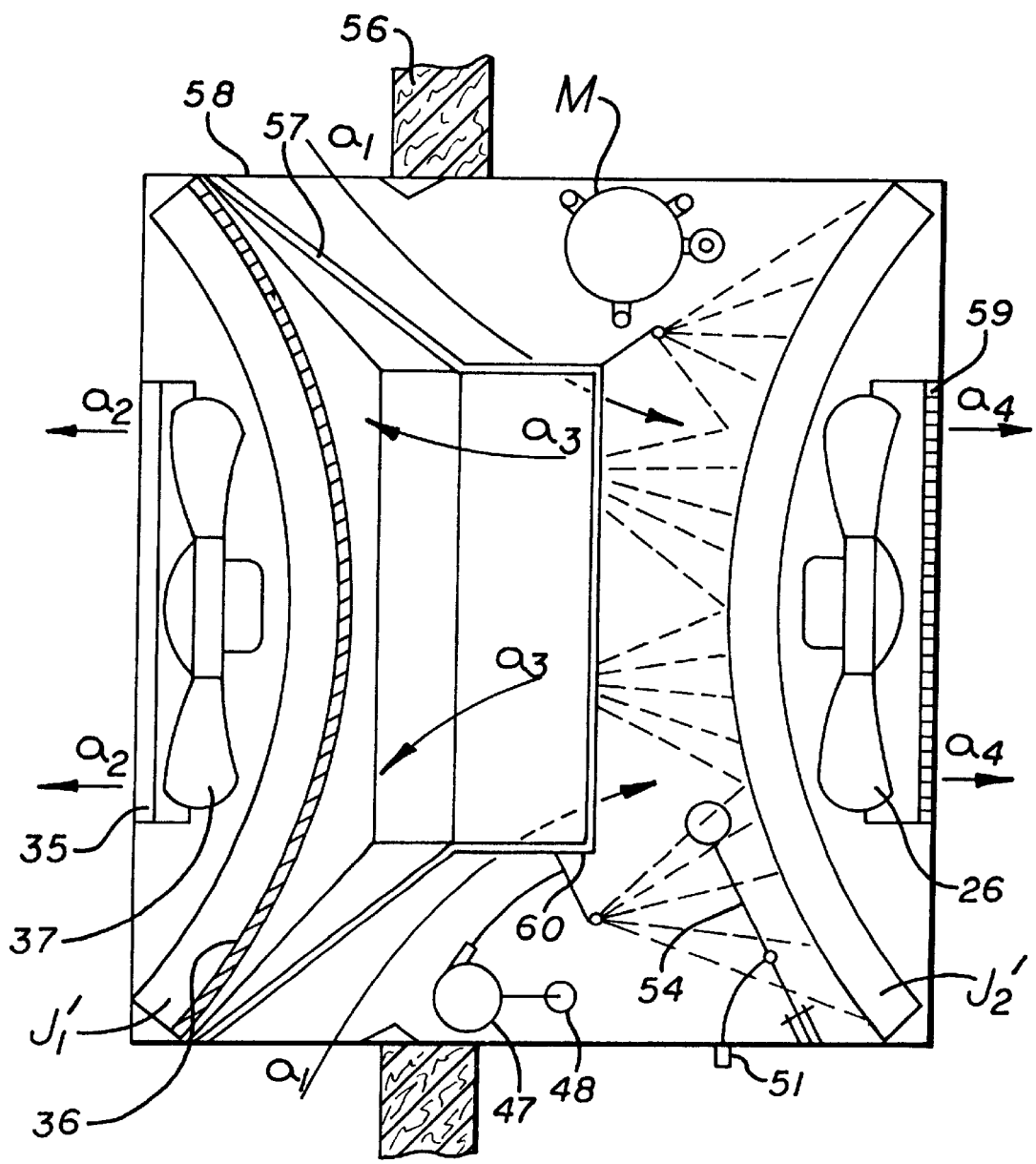
FIG. 14 is a structural schematic diagram of J1' J2' 8-form window machine.

FIG. 14 is a structural schematic diagram of J2'J2' 8-form window machine.

An indoor front fan 37 and an outdoor rear fan 26 are mounted respectively in the concave arc of J1' pipe and J2' pipe, and under their suction actions:

outdoor air a3 from an oblique window 60 on top of outside wall 56 through a filter screen 36 from the convex arc face of J1 pipe enters ducts F' to be cooled to a2 then through the guide of an adjustable damper 35 and is conveyed indoor, the temperature of a2 can be set by P1 state.

Indoor air a1 from air inlets at both sides indoor through the convex arc face of J2' pipe enters ducts F to absorb heat and moisture to a4 and is discharged to outdoor atmosphere.

In the bottom tray there are a water level controller and a water circulating systems and a low pressure pump.

In the bottom tray of the above-mentioned J1, (J1'), J2, (J2') 刀-form and 8-form window machines or outdoor machines, there are all water circulating and water level control systems, under air state of ordinary humidity the consumption of water is very little, in case of water deficit state a proper amount of cool-carrying agent not readily volatile to air as glycerin or glycol water solution may be filled in the bottom tray to constitute a self-sufficient water equilibrium circulating system.

Figure 15:
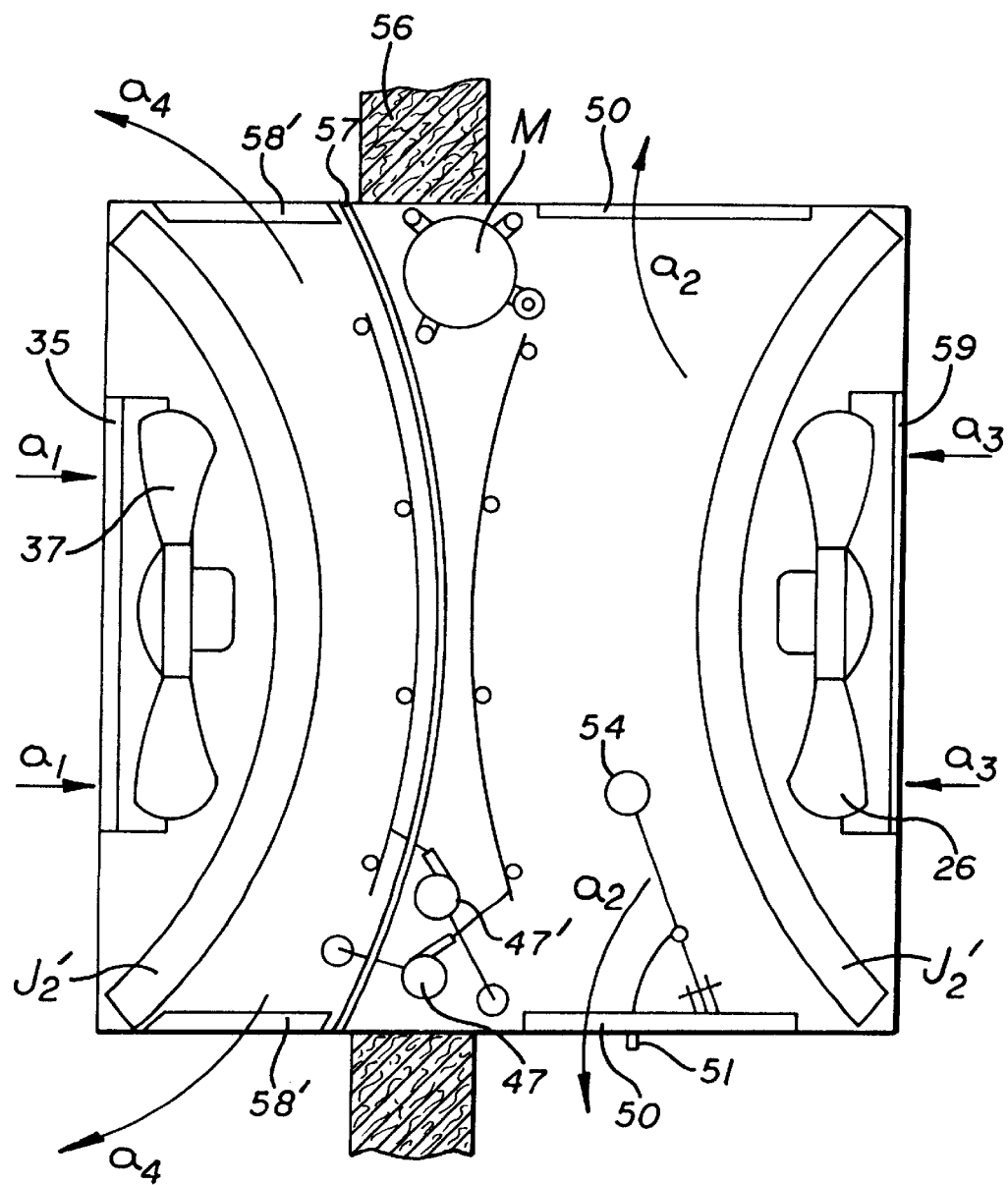
FIG. 15 is a structural schematic diagram of J2' J2 刀-form heat pump type window machine.

FIG. 15 is structural schematic diagram of a J2'J2' 刀-form heat pump type window machine. The condenser and evaporator all use J2' pipe for ready change-over during heat generating. During refrigerating, the fans, J pipes, and ventilating structure are identical with J1'J2' 刀-form window machine of FIG. 13. Air inlet 58 on indoor both sides can be remade into adjustable air windows 58' to be used as water baffles during refrigerating and as adjustable air windows during heat generating, the water solution in the bottom tray is separated into indoor bottom tray and outdoor bottom tray by a partition 57, each J2' pipe is allocated a set of water circulating system compose of water pump, filter, nozzles and connecting tubing. In the bottom tray may be filled any one kind of water solutions of cool-carrying agent as glycerin, glycol, lithium chloride, lithium bromide not readily volatile to air to constitute an outside circulating working substance of J2' pipe and water equilibrium.

During refrigerating, the water pump 47 sprays the dilute water solution in the indoor bottom tray at intervals and in timing, metering to outdoor J2' pipe, simultaneously the water pump 47' sprays the concentrate water solution in the outdoor bottom tray at intervals and in timing, metering to indoor J2' pipe, to constitute a water equilibrium system of supplying water or supplying no water.

During generating heat, the reversing valve transforms the indoor J2' pipe into a condenser, the indoor and out door fans 37, 26 will rotate in the reverse direction. Indoor air a1 through the adjustable damper 35 from the concave arc face of indoor J2' enters ducts for increasing heat and moisture to a4 and is led indoor from the adjustable air window 58'; outdoor air a3 through protecting screen 59 from the concave arc face of outdoor J2' passes ducts for reducing temperature and moisture to a2 and is discharged to atmosphere from water baffles 50 at both sides of outside wall. With the same reason, the water pump 47 sprays the concentrated water solution in the indoor bottom tray at intervals and in timing, metering to the convex arc face of outdoor J2' pipe to prevent ducts from frosting, simultaneously the water pump 47 also sprays the dilute water solution in the outdoor bottom tray to the convex arc face of indoor J2' to adjust the humidity of a4, so as to constitute an equilibrium system of supplying water or supplying no water and to adjust the required humidity.

When the cool-carrying agent water solution in bottom tray is a salt category of lithium chloride or lithium bromide, the material for making flats tubes 14 or slender round tubes 14' of J2 strips ought to be corrosion resistant stainless steel. During refrigerating, the bottom tray may also use water alone as an outside circulating working substance.

The J2'J2' 刀-form heat pump type window machine of the above-mentioned FIG. 15 can be decompose along the partition 57 into indoor and outdoor side two portions, hence it is possible by the same reason to make up a J2'J2' 刀-form heat pump type split-body machine.

Figure 16:
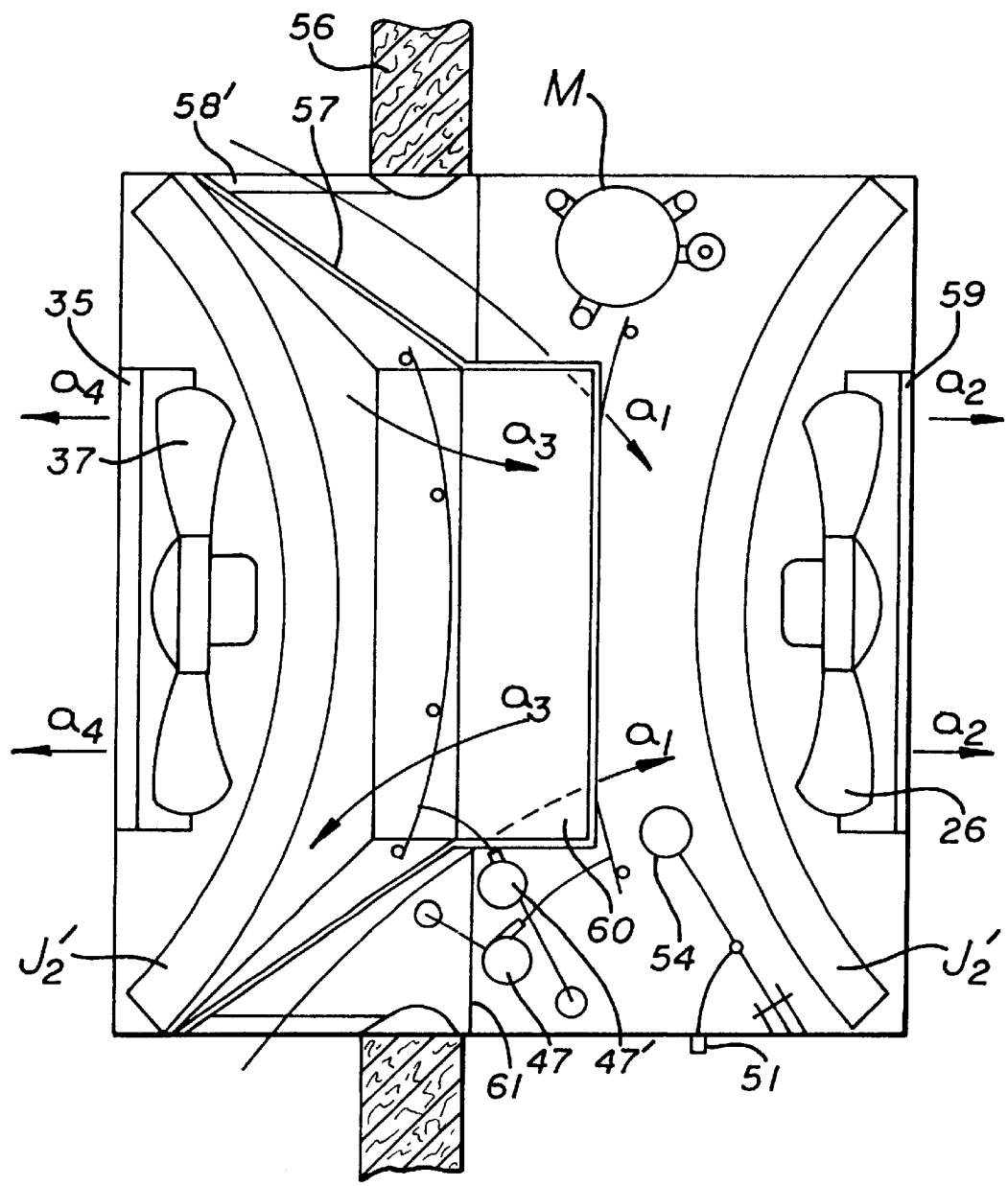
FIG. 16 is a structural schematic diagram of J2' J2' 8-form heat pump type window machine.

FIG. 16 is a structural schematic diagram of a J2'J2' 8-form heat pump type window machine. The condenser and evaporator all use J2' pipe for ready conversion of refrigerating and heat generating, during refrigerating the ventilating structure is the same as J1'J2' 8-form window machine of FIG. 14. The bottom tray is divided by a partition 61 into indoor bottom tray and outdoor bottom tray two portions, the indoor and outdoor J2' have each a set of water circulating system, in the bottom tray is filled in a cool-carrying agent water solution not readily volatile to air to constitute an outside circulating working substance of supplying water or supplying no water.

During refrigerating, the water pump 47 sprays the dilute water solution in the indoor side bottom tray at intervals and in timing, metering to outdoor J2' pipe, the water pump 47' sprays the concentrated water solution in the outdoor side bottom tray at intervals and in timing, metering to indoor J2' pipe to constitute an outside working substance circulation. During spraying mist, indoor and outdoor fans 37 and 26 ought to stop rotation.

During generating heat, the reversing vale transforms the indoor J2' pipe into a condenser and transform the outdoor J2' pipe into an evaporator. Indoor air a1 from adjustable air windows 58' on indoor both sides through outdoor J2' pipe to be cooled to a2 is discharged to outdoor atmosphere, outdoor air a3 from oblique windows on top of outside wall 56 through indoor J2' to absorb heat and moisture to a4 passes the guide of an adjustable damper 35 and is conveyed indoor. Its outside circulating working substance and water circulating system are identical with J2'J2' 刀-form heat pump type window machine.

The above-mentioned 刀-form circulating and all-fresh air 8-form circulating J pipe air conditioners adopt therein circulating working substance pair composed of absorbent and its corresponding refrigerant, its object is to store the heat energy released from refrigerated air during cooling procedure in the absorbent solution to the maximum degree (transformed into chemically absorbed energy), or in other words the absorbent solution will be, to the maximum degree, heated and concentrated by refrigerated air from t1~tn to lower the condensing pressure as far as possible, and to make the low pressure pump M run at the lowest obtainable $P2-P1=\Delta P$ pressure difference. In the same J pipe air conditioner, it is also possible to use a single or mixed (azeotropy or non-azeotropy) refrigerant (not working substance pair) as circulating working substance, at this moment the J pipe unit can obtain the maximum refrigerating capacity, however, right now the running of J pipe air conditioner is in Carnot or Lorentz cycle.

The preferred outside circulating working substance of J1 (J1') J2 (J2') 8-form or 刀-form J pipe air conditioners is water, its action is to the maximum degree able to lower the condensing pressure P2 and temperature of J2 pipe, the object to add cool-carrying agent (glycerin, glycol) water solution in the bottom tray of their window machines or outdoor machines is to compensate for inadequacy of condensation of J2 pipe during water deficient state (water supplying slender tube unable to supply water continuously).

For any J2(J2')J2(J2') 8-form or 刀-form J pipe air conditioner composed of 2 J2 pipes being used simultaneously, each J2 pipe is allocated a set of water circulating system. When the outside circulating working substance in the bottom tray is a category of lithium chloride, lithium bromide, calcium chloride aqueous absorption salts water solution, the concentrated salt water solution is sprayed to the air exit surface of J2 pipe (evaporating J2 pipe) used as evaporator to make it uniformly distributed over the surfaces of membrane type evaporating surface 16 and membrane corrugation 2 surface of ducts F, the cooled air in ducts F has strong moisture and heat dissipating action to very much strengthen the heat exchange action of J2 pipe, the circulating working substance in J2 strips can also obtain heat from cooled air to the maximum degree, on the other hand it is also possible to raise the defined evaporating temperature and pressure P1 and during heat generating running to prevent ducts F from surface frosting and facilitate to extract heat and humidity from air being cooled. The concentrated salt water solution absorbs water and releases heat from ducts surfaces and is gradually transformed into dilute salt water solution to flow into bottom tray from air facing surface, the water circulating system provided to the condenser J2 pipe (condensing J2 pipe) periodically extracts it away and sprays toward the air facing surface of cooling air (air to be generated out of heat during heat generating) of condensing J2 pipe, then the moisture is released and heat is absorbed on ducts F surfaces and gradually transforms into concentrated salt water solution to flow from air exit surface and converges to bottom tray, the water circulating system provided to the evaporating J2 pipe extracts . . . and sprays toward air exit surface of evaporating J2 pipe. The action of the two J2 pipes transforms with each other during refrigerating and heat generating. The above-mentioned circulation is called the outside 8-form circulation from raising evaporating pressure P1 to raise thermodynamic cycle efficiency, and during generating heat it is possible to raise the temperature and humidity of air to be heated to prevent ducts F surfaces of evaporating of J2 pipe from frosting.

When glycerin or glycol such kind of water solution is used as outside circulating working substance, the main object lies in preventing evaporating J2 pipe ducts F surfaces from frosting and raising the temperature and humidity of output warm air of condensing J2 pipe, so as to raise the air conditioning comfort degree during generating heat and to prevent water deficiency by water supplying slender tube during refrigerating.

What is claimed is:

1. A kind of air conditioner with high-efficiency differential cold-valley pipes comprises differential cold-valley pipes J1 and J2 and a low pressure pump M, characterized in that:

A. In the heat exchanger J1 pipe: Multiple-layer J1 strips and multiple-layer corrugated fin step corrugations (31) are stacked alternately and tightly clamped up into frames composed of rib-shaped clamping plates (3) and tie rods (4), at the contact places of said clamping plates (3) and step corrugations (31) there are buffer cushions (18), the step ducts F' in vertical parallel arrangement to approximate a rectangle formed by step corrugations (31) and said J1 strips (30) are in a flow direction of S shape, on each vertical wall surface of said step corrugations are cut out several long and strip-shaped heat insulating ports (17), at both ends of each step corrugation (31) is a rectangled pad (7), the step corrugations (31) are made of thin aluminum sheet or hydrophilic aluminum sheet, each J1 strip (30) has a t1 working substance evaporating temperature~tn working substance return vapor temperature continuously temperature changing working substance flow passage formed by inserting inner corrugated plates (15) made of thin aluminum sheet into 2–5 metallic copper or aluminum flat tubes (14) arranged in parallel spacing and connected in series, at each turn of flow of said working substance flow passage there is a curved conduit (6), the flat tube (14) end at the inlet and outlet of working substance flow passages are respectively connected with incoming liquid branch tube (23) and suction vapor branch tube (27), the Suction vapor branch tube (27) after being connected in parallel with parallel connecting tube or distributor (28) is connected again with suction vapor tube (29), the incoming liquid branch tube (23) after being connected in parallel with distributor (24) is again connected with the capillary tube (25), the capillary tube (25) is connected with the liquid supply tube (13);

B. In the heat exchanger J2 pipe: The Multiple-layer J2 strips (1) and multiple-layer corrugated fin step membrane corrugations (2) are stacked alternately and tightly clamped up into frames composed of rib-shaped claming plates (3) and tie rods (4), at the contact places of said clamping plates (3) and membrane corrugations (2) there are buffer cushions (18), the step ducts F in vertical and parallels arrangement to approximate a rectangle formed by membrane corrugations (2) and said J2 strips (1) are in a flow direction of S shape, on each vertical wall surface of membrane corrugations (2) are cut out several long and strip-shaped heat insulating ports (17), at both ends of each membrane corrugation (2) there is a rectangled pad (7), each J2 strip has a t'n working substance vapor discharging temperature of the low pressure pump~t'1 liquid state working substance temperature after condensation continuously temperature changing working substance flow passage formed by inserting inner corrugated plates (15) made of thin aluminum sheet into 2–5 metallic copper or aluminum flat tubes (14) arranged in parallel spacing and connected in series, at each turn of flow of said working substance flow passage there is a curved conduit (6), the flat tube (4) ends at the inlet and outlet of working substance flow passages are connected respectively with an incoming vapor branch tube (8) and outgoing liquid branch tube (11), the incoming vapor branch tube (8) after being connected in parallel with parallels connecting tube or distributor (9) is connected again with incoming vapor tube (10), the outgoing branch tube after being connected in parallel with the distributor or parallel connecting tube (12) is again connected with a liquid supplying tube (13), outside the flat tubes (14) arranged in parallel spacing are wrapped membrane type evaporating surfaces (16), between membrane evaporating surfaces (16) and flat tubes (14) are inserted water-carrying yarns (20), the membrane corrugations (2) are corrugated fins made of thin aluminum sheet or metallic wire mesh adhered with non-woven fabric on both surfaces, and with thin aluminum sheet or metallic wire mesh inside to form supporting frame step corrugations (21) and with its surfaces to form step membranes (22), the water-carrying yarns (20), step membranes (22), membrane type evaporating surfaces (16) are made of corrosion resistant non-woven fabric adhesive-bonded fabric with extra high water-carrying and water absorbing capacity;

C. The low pressure pump M is connected between the vapor suction tube (29) leading to J1 pipe and the incoming vapor tube (10) leading to J2-pipe, the heat pump type is connected with a four-way conversion valve in between, the low pressure pump M will work between a rather low condensing pressure P2 and a rather high evaporating pressure P1 and can jointly convey liquid and vapor; the maximum refrigerating/ heat generating capacity can be obtained when the circulating working substance is a single or mixed azeotropy working substance, the 刀-form circulation and all fresh air 8-form circulation can be run at the highest circulation efficiency when the circulating working substance is a working substance pair composed of refrigerant and absorbent.

2. Said air conditioner with high-efficiency differential cold-valley pipes claim 1, characterized in that: When the flat tubes (14) in J1 strips (30) and J2 strips (1) therein are arranged in concentric arc direction with parallel spacing, the step corrugations (31) among J1 strips (30) and membrane corrugations (2) among J2 strip (1) show a sector-shaped distribution, when the plane and straight rib-shaped clamping plates are deformed to arc rib-shaped clamping plates, the plane and straight J1 pipe and J2 pipe will be deformed then to arc J1' pipe and J2' pipe; the flat tubes (14) in J2 strips (1) in the above-mentioned J2 pipe and J2' pipe can also be replaced by metallic slender round tubes (14').

3. Said air conditioner with high-efficiency differential cold-valley pipes claim 1 characterized in that: J1 pipe and J1' pipe used as evaporating J pipe can also be used as condensing J pipe, J2 pipe and J2' pipe used as condensing J pipe can also be used as evaporating J pipe, during refrigerating: When the air being cooled by evaporating J pipes is outdoor air a3 and the air to cool the condensing J pipe is indoor air a1, the J pipe air conditioner is running in all-fresh air 8-form circulation, when the air being cooled by evaporating J pipe is indoor air a1 and the air to cool condensing J pipe is outdoor air a3, the J pipe air conditioner is running in 刀-form circulation, during heat generating: When the air being heated by condensing J pipe is outdoor air a3 and the air being cooled by evaporating J pipe is indoor air a1, the J pipe air conditioner is running in all-fresh air 8-form circulation, when the air being heated by condensing J pipe is indoor air a1 and the air being cooled by evaporating J pipe is outdoor air a3, the J pipe air conditioner is running in 刀-form circulation.

4. Said air conditioner with high-efficiency differential cold-valley pipes claim 1 characterized in that: When window machines or split-body machines of 8-form or 刀-form circulation are composed of using J1 pipe or J1' pipe as evaporating J pipe and using J2 pipe or J2' pipe as condensing J pipe, in the bottom tray of their window machines or outdoor units of split-body machines is mounted a water circulating system composed of a water pump (47), filter (48), nozzles (49) and connecting tubing, which sprays by automatic control system according to requirement at intervals, and in timing, metering the water solution in the bottom tray to an air facing surface of J2 pipe or J2' pipe, the water level in bottom tray is controlled by a water level control system composed of a float (54), an on-off adapter (53), a supporter (52), water supplying slender tube (51), etc., the condensed water of J1 pipe or J1' pipe can be led to the bottom tray, when the water supplying slender tube can not continuously supply water, glycerin or glycol or other cool-carrying agents not readily volatile to air can be added into the bottom tray to constitute a self-sufficient water equilibrium system, the outdoor unit of the above-mentioned split-body machines can also be matched with the indoor machine of current air conditioners.

5. Said air conditioner with high-efficiency differential cold-valley pipes claim 1 characterized in that: When the condensing J pipe and evaporating J pipe all use J2 pipe or J2' pipe to compose window machines or split-body machines of 8-form or 刀-form circulation, each J2 pipe or J2' pipe has water storing bottom trays and water circulating system, wherein one bottom tray is provided with a water level control system, when lithium chloride, calcium chloride, lithium bromide water absorbing salt solution is added into the bottom tray: The water pump of evaporating J pipe strays at intervals and in timing, metering concentrated salt solution in the bottom tray of condensing J pipe to an air exist surface of evaporating J pipe, during spraying mist their fans stop rotating, the concentrated salt water solution on surface of ducts F gradually absorbs moisture and releases heat to transform into dilute salt water and to flow to bottom tray from an air facing surface, simultaneously the water pump of condensing J pipe also sprays the dilute salt solution in the bottom of evaporating J pipe at intervals and in timing, metering to the air facing surface of condensing J pipe, during spraying mist, their fans stop rotating, the dilute salt water solution on its surface of ducts F gradually releases moisture and absorbs heat to transform into concentrated salt water solution and to converge into bottom tray from the air exist surface, during heat generating, actions of condensing J pipe and evaporating J pipe change with each other, the circulation constituted by the above-mentioned outside circulating working substance salt water solution is an outside 8-from circulation, the outside circulating working substance can also be water solution of glycerin, glycol and other cool-carrying agents not readily volatile to air during refrigerating the outside circulating working substance can use water alone.

6. Said air conditioner with high-efficiency differential cold-valley pipes claim 1 characterized in that: Air inlets of outdoor air a3 of outdoor machine of 刀-form split-body machines using J1 pipe or J1' pipe as evaporating J pipe and J2 pipe or J2' pipe as condensing J pipe are provided with water baffles (50); an indoor fan (37) and an outdoor fan (26) at the front and rear two end faces of a 刀-form window machine using J1' pipe as evaporating J pipe and J2' pipe as condensing J pipe are mounted respectively in the concave arc of J1' pipe and J2' pipe, air inlets (58) of indoor air a1 is provided at two sides inside the wall (56), air lets of outdoor air a3 is provided at two sides outside the wall (56), at the air inlets there are water baffles (50), an indoor fan (31) and an outdoor fan (26) at the front and rear two end faces of an 8-form window machine using J1 ' pipe as evaporating J pipe and J2' pipe as condensing J pipe are mounted respectively in the concave arc of J1' pipe and J2' pipe air outlet (58) of indoor air a1 is provided at two sides inside the wall (56), outdoor air a3 from a top oblique window (60) outside the wall enters the convex arc face of J1' pipe to be cooled to a2 ducts F' and is conveyed indoors.

7. Said air conditioner with high-efficiency differential cold-valley pipes claim 1, characterized in that: the indoor fan (37) and outdoor fan (26) at the front and rear two end faces are mounted respectively in the concave arc of indoor J2' pipe and outdoor J2' pipe, the ventilating ports of indoor air of its 刀-form machine are provided at two sides inside the wall (56), at the ventilating ports are provided adjustable air windows (58'), ventilating ports of outdoor air a3 are provided at two sides outside the wall (56), at the ventilating ports are provided water baffles (50), the air outlets of indoor air a1 of its 8-form machine are provided at two sides inside the wall (56), at the air outlets are provided adjustable air windows (58'), outdoor air a3 from a top oblique window (60) outside the wall (56) enters J2' convex arc face to be cooled or generated of heat in ducts F and then is conveyed indoors.

* * * * *